United States Patent
Stoica et al.

(10) Patent No.: US 11,762,569 B2
(45) Date of Patent: Sep. 19, 2023

(54) WORKLOAD BASED RELIEF VALVE ACTIVATION FOR HYBRID CONTROLLER ARCHITECTURES

(71) Applicant: International Business Machines Corporation, Armonk, NY (US)

(72) Inventors: Radu Ioan Stoica, Zurich (CH); Roman Alexander Pletka, Uster (CH); Timothy Fisher, Cypress, TX (US); Nikolaos Papandreou, Thalwil (CH); Sasa Tomic, Kilchberg (CH); Nikolas Ioannou, Zurich (CH); Aaron Daniel Fry, Richmond, TX (US); Charalampos Pozidis, Thalwil (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 16/667,702

(22) Filed: Oct. 29, 2019

(65) Prior Publication Data
US 2021/0124488 A1    Apr. 29, 2021

(51) Int. Cl.
*G06F 3/06* (2006.01)
*G06F 12/02* (2006.01)
*G06F 9/30* (2018.01)

(52) U.S. Cl.
CPC ............ *G06F 3/064* (2013.01); *G06F 3/0611* (2013.01); *G06F 3/0679* (2013.01);
(Continued)

(58) Field of Classification Search
None
See application file for complete search history.

(56) References Cited

U.S. PATENT DOCUMENTS 7,139,864 B2 * 11/2006 Bennett .............. G11C 11/5628
                                                                  711/103
7,409,489 B2 * 8/2008 Sinclair ................. G06F 3/0652
                                                                  711/103

(Continued)

FOREIGN PATENT DOCUMENTS

| CN | 102346652 A | 2/2012 |
| CN | 107527655 A | 12/2017 |
| TW | I352353 B | 11/2011 |

OTHER PUBLICATIONS

Chang et al. "Exploiting Write Heterogeneity of Morphable MLC/SLC SSDs in Datacenters with Service-Level Objectives." Aug. 2017. IEEE. IEEE Transactions on Computers. vol. 66. pp. 1457-1463. (Year: 2017).*

(Continued)

*Primary Examiner* — Nathan Sadler
(74) *Attorney, Agent, or Firm* — Zilka-Kotab, P.C.

(57) ABSTRACT

A computer-implemented method, according to one embodiment, includes: maintaining a first subset of the plurality of blocks in a first pool, where the blocks maintained in the first pool are configured in SLC mode. A second subset of the plurality of blocks is maintained in a second pool, where the blocks maintained in the second pool are configured in multi-bit-per-cell mode. A current I/O rate for the memory is identified during runtime, and a determination is made as to whether the current I/O rate is outside a first range. In response to determining that the current I/O rate is not outside the first range, the blocks maintained in the first pool are used to satisfy incoming host writes. Moreover, in response to determining that the current I/O rate is outside the first range, the blocks maintained in the second pool are used to satisfy incoming host writes.

19 Claims, 12 Drawing Sheets

(52) U.S. Cl.
CPC ........ *G06F 9/3004* (2013.01); *G06F 12/0246* (2013.01); *G06F 2209/5011* (2013.01)

(56) References Cited

U.S. PATENT DOCUMENTS

| | | | | |
|---|---|---|---|---|
| 7,444,461 | B2* | 10/2008 | Traister | ............... G06F 12/0246 |
| | | | | 711/103 |
| 7,948,798 | B1 | 5/2011 | Sheredy et al. | |
| 8,407,400 | B2 | 3/2013 | Marotta et al. | |
| 9,405,621 | B2 | 8/2016 | Yu et al. | |
| 2011/0153913 | A1* | 6/2011 | Huang | .................. G06F 3/0611 |
| | | | | 711/103 |
| 2016/0041870 | A1 | 2/2016 | Davis et al. | |
| 2018/0373593 | A1 | 12/2018 | Yang | |
| 2019/0369899 | A1* | 12/2019 | Tanpairoj | ............ G06F 12/0253 |
| 2020/0073795 | A1* | 3/2020 | Asano | .................. G06F 3/0679 |
| 2020/0159419 | A1* | 5/2020 | Li | ......................... G06F 3/0659 |
| 2020/0393972 | A1* | 12/2020 | Tomic | ................... G11C 16/26 |
| 2021/0004159 | A1* | 1/2021 | Pletka | .................. G06F 3/0644 |

OTHER PUBLICATIONS

Porush, V., "Architectural Support for Unified Memory Controller," University of Illinois, Thesis, 2016, pp. 1-157.

Anonymous, "Silent Store Aware Storage and Checkpoint Management in Flash," IP.com Prior Art Database, Technical Disclosure No. IPCOM000239436D, Nov. 6, 2014, pp. 1-2.

Yim, K., "A Novel Memory Hierarchy for Flash Memory Based Storage Systems," Journal of Semiconductor Technology and Science, vol. 5, No. 4, Dec. 2005, pp. 262-269.

Yang et al., "Utilization-Aware Self-Tuning Design for TLC Flash Storage Devices," IEEE Transactions on Very Large Scale Integration (VLSI) Systems, vol. 24, No. 10, Oct. 2016, pp. 3132-3144.

Micheloni et al., "Hybrid Storage Systems," Inside Solid State Drives, Springer Link, 2018 pp. 43-59 (abstract only).

Park et al., "A hybrid flash translation layer design for SLC-MLC flash memory based multibank solid state disk," Microprocessors and Microsystems, vol. 35, 2011, pp. 48-59.

* cited by examiner

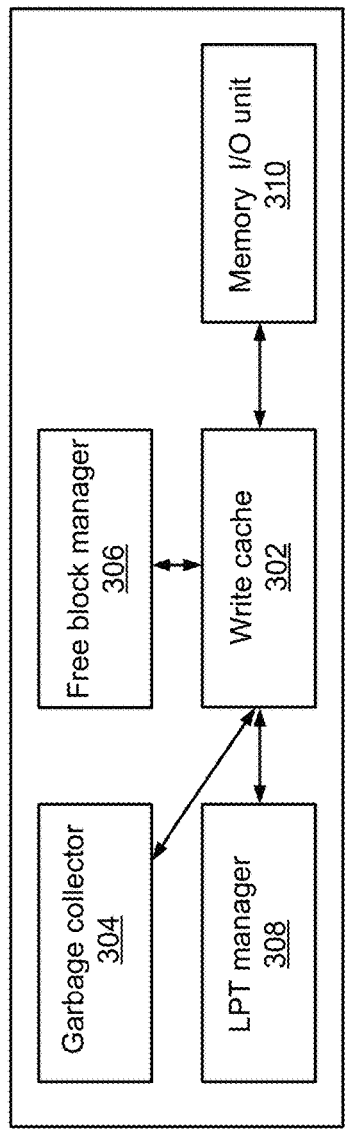
FIG. 3
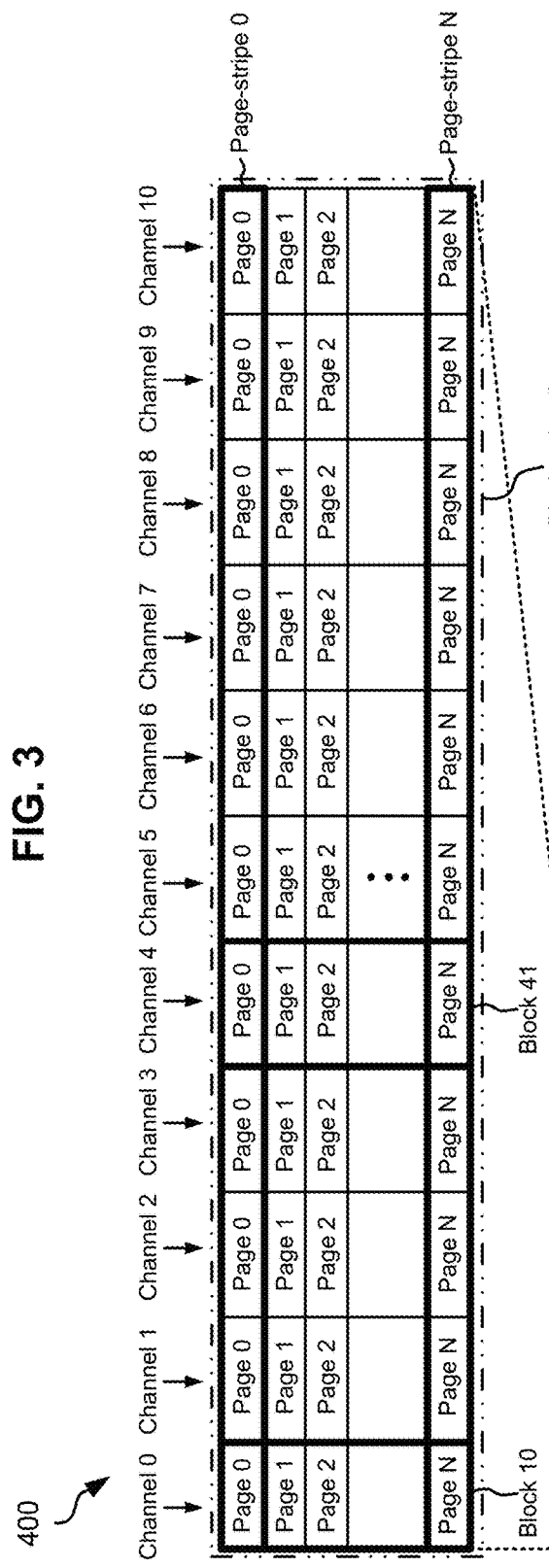
FIG. 4

770

| Notation | Description |
|---|---|
| $tread, tprog, terase$ | The latency of a read, program or erase operation. |
| $pages$ | The number of pages in a flash block. |
| $frel$ | The fraction of pages valid at cleaning and relocated to the same tier. |
| $fev$ | The fraction of pages valid at cleaning and destaged to the QLC tier. |

FIG. 7C

WORKLOAD BASED RELIEF VALVE ACTIVATION FOR HYBRID CONTROLLER ARCHITECTURES

BACKGROUND

The present invention relates to data storage systems, and more particularly, this invention relates to counteracting unsustainable input/output (I/O) rates in architectures where data is stored on multiple types of storage mediums with different properties.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The physical configurations of memory blocks in non-volatile memory have also changed over time. For instance, in the past Flash blocks had a single-bit-per-cell configuration, but improvements in data storage have introduced Flash blocks that implement multi-bit-per-cell configurations. Some Flash blocks also support more than one different physical configuration, e.g., based on their given mode. Moreover, hybrid controllers are capable of managing and/or adapting these blocks which are configured in single-bit-per-cell mode as well as multi-bit-per-cell mode.

SUMMARY

A computer-implemented method, according to one embodiment, is for managing a plurality of blocks of memory in two or more pools. The computer-implemented method includes: maintaining a first subset of the plurality of blocks in a first pool, where the blocks maintained in the first pool are configured in single-level cell (SLC) mode. A second subset of the plurality of blocks is also maintained in a second pool, where the blocks maintained in the second pool are configured in multi-bit-per-cell mode. A current input/output (I/O) rate for the memory is identified during runtime, and a determination is made as to whether the current I/O rate is outside a first predetermined range. In response to determining that the current I/O rate is not outside the first predetermined range, the blocks maintained in the first pool are used to satisfy incoming host writes. Moreover, in response to determining that the current I/O rate is outside the first predetermined range, the blocks maintained in the second pool are used to satisfy incoming host writes.

A computer program product, according to another embodiment, is for managing a plurality of blocks of memory in two or more pools. The computer program product includes a computer readable storage medium having program instructions embodied therewith. Moreover, the program instructions are readable and/or executable by a processor to cause the processor to: perform the foregoing method.

A system, according to yet another embodiment, includes: memory, a processor, and logic that is integrated with and/or executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

FIG. 7C is a table which defines various ones of the variables included in Equation 1 and Equation 2, in accordance with one embodiment.

DETAILED DESCRIPTION

Figure 1:
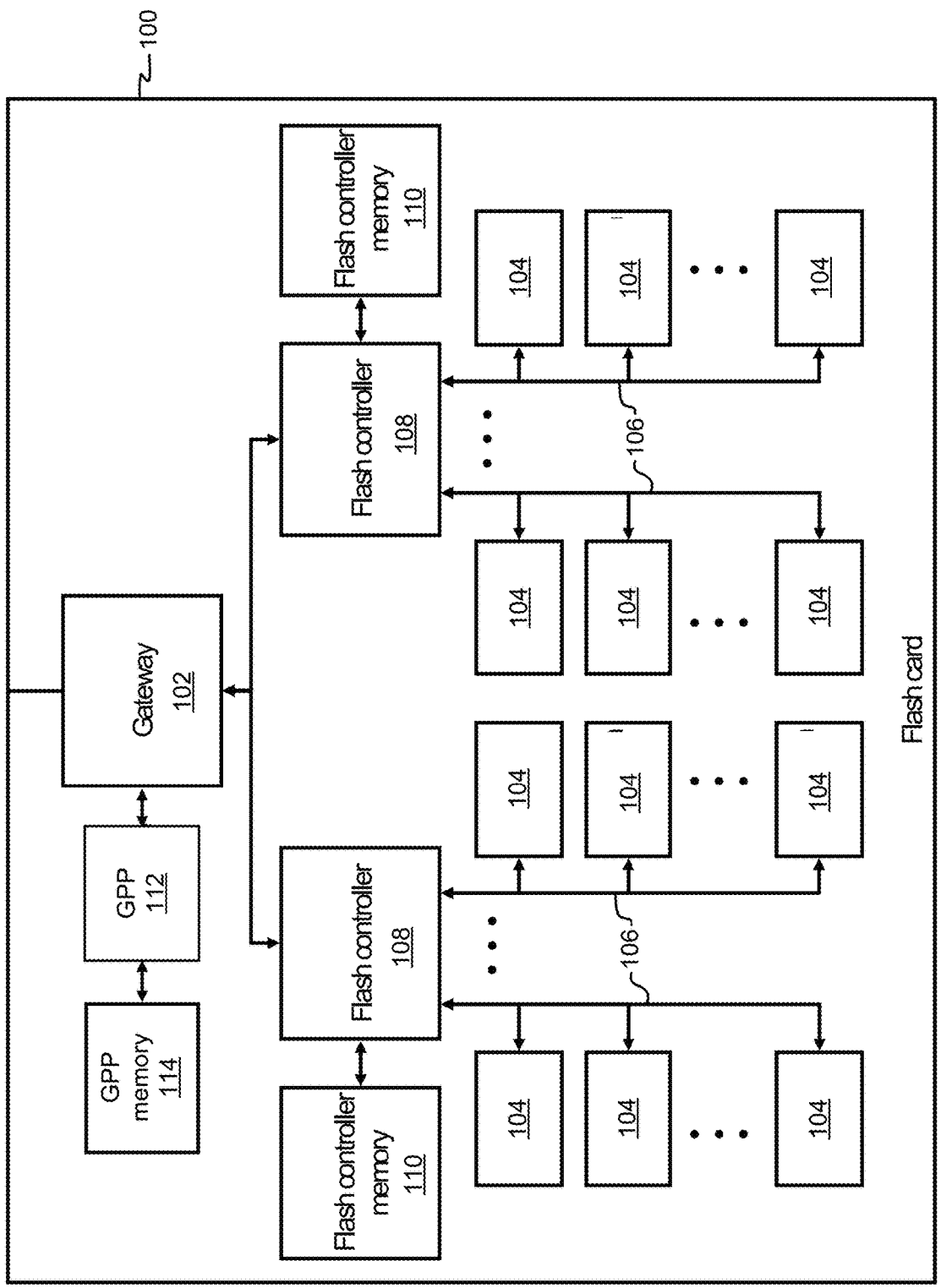
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for managing a plurality of blocks of memory in two or more pools. The computer-implemented method includes: maintaining a first subset of the plurality of blocks in a first pool, where the blocks maintained in the first pool are configured in single-level cell (SLC) mode. A second subset of the plurality of blocks is also maintained in a second pool, where the blocks maintained in the second pool are configured in multi-bit-per-cell mode. A current input/output (I/O) rate for the memory is identified during runtime, and a determination is made as to whether the current I/O rate is outside a first predetermined range. In response to determining that the current I/O rate is not outside the first predetermined range, the blocks maintained in the first pool are used to satisfy incoming host writes. Moreover, in response to determining that the current I/O rate is outside the first predetermined range, the blocks maintained in the second pool are used to satisfy incoming host writes.

In another general embodiment, a computer program product is for managing a plurality of blocks of memory in two or more pools. The computer program product includes a computer readable storage medium having program instructions embodied therewith. Moreover, the program instructions are readable and/or executable by a processor to cause the processor to: perform the foregoing method.

In yet another general embodiment, a system includes: memory, a processor, and logic that is integrated with and/or executable by the processor. Moreover, the logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
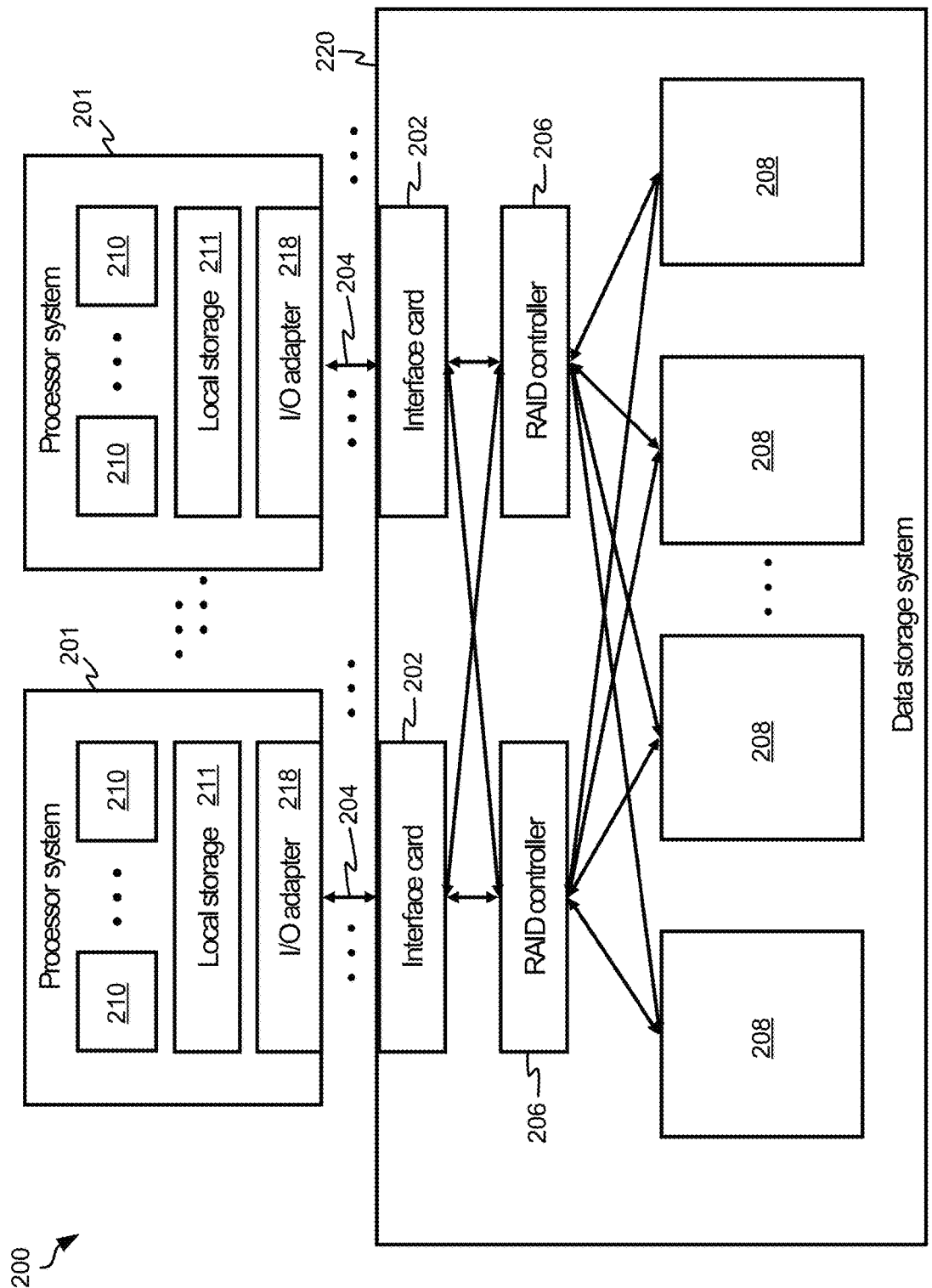
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112 and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 and/or GPP 112 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB or 16 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripes. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of reduced I/O throughput, increased I/O latency, and reduced endurance of the storage medium. For example, memory blocks having a single-bit-per-cell configuration experience write latencies that are up to 10 times lower than experienced by memory blocks having multi-bit-per-cell configurations. Similarly, memory blocks having a single-bit-per-cell configuration experience lower read latencies than memory blocks having multi-bit-per-cell configurations.

This tradeoff between storage capacity versus performance and endurance allows for storage systems to tailor the performance capabilities of memory to some extent. For instance, a storage system predicted to have a high amount of I/O traffic or program/erase (P/E) cycles is able to selectively use a greater number of memory blocks having a single-bit-per-cell configuration than those having multi-bit-per-cell configurations. Conversely, a storage system predicted to store a large amount of cold data is able to selectively use a greater number of memory blocks having multi-bit-per-cell configurations than those having a single-bit-per-cell configuration.

While the difference in performance characteristics between the different memory block configurations may be utilized to adapt to the given workload, this is only possible when enough free memory blocks are available for writing new data and/or when the data relocation overhead inside the storage device is low. However, in many scenarios, depending on the dynamic properties of the workload and the internal state of the controller, higher tail latencies are experienced by conventional procedures due to starvation of ready-to-use (RTU) memory blocks and/or reduced performance and endurance because most host data is written twice. In a typical implementation, new host writes are first stored in the single-bit tier and later destaged to the multi-bit tier. Moreover, in order to write data to a block having a single-bit-per-cell configuration, at least one clean block configured as such must be available. It follows that if no blocks having a single-bit-per-cell configuration are available, valid data is relocated and/or destaged in order to free an existing block of memory.

Furthermore, relocating and/or destaging data in this manner involves performing garbage collection operations also in the multi-bit tier. Moreover, a number of internal data movements have to be processed in parallel to host writes in the background, thereby causing these conventional procedures to consume a significant amount of internal bandwidth. Free memory blocks also have to be made available prior to performing actual write operations, thereby significantly increasing the overhead caused by new host write operations. Further still, other internal background maintenance tasks in the controller can also interfere with performance. For example, block calibration, data scrubbing for error detection and correction, wear levelling activities, etc. have further increased operational inefficiencies for conventional procedures.

In sharp contrast to these shortcomings experienced by conventional procedures and systems, various ones of the embodiments included herein implement a system architecture which are able to correct unsustainable I/O rates, e.g., as will be described in further detail below.

Figure 5:
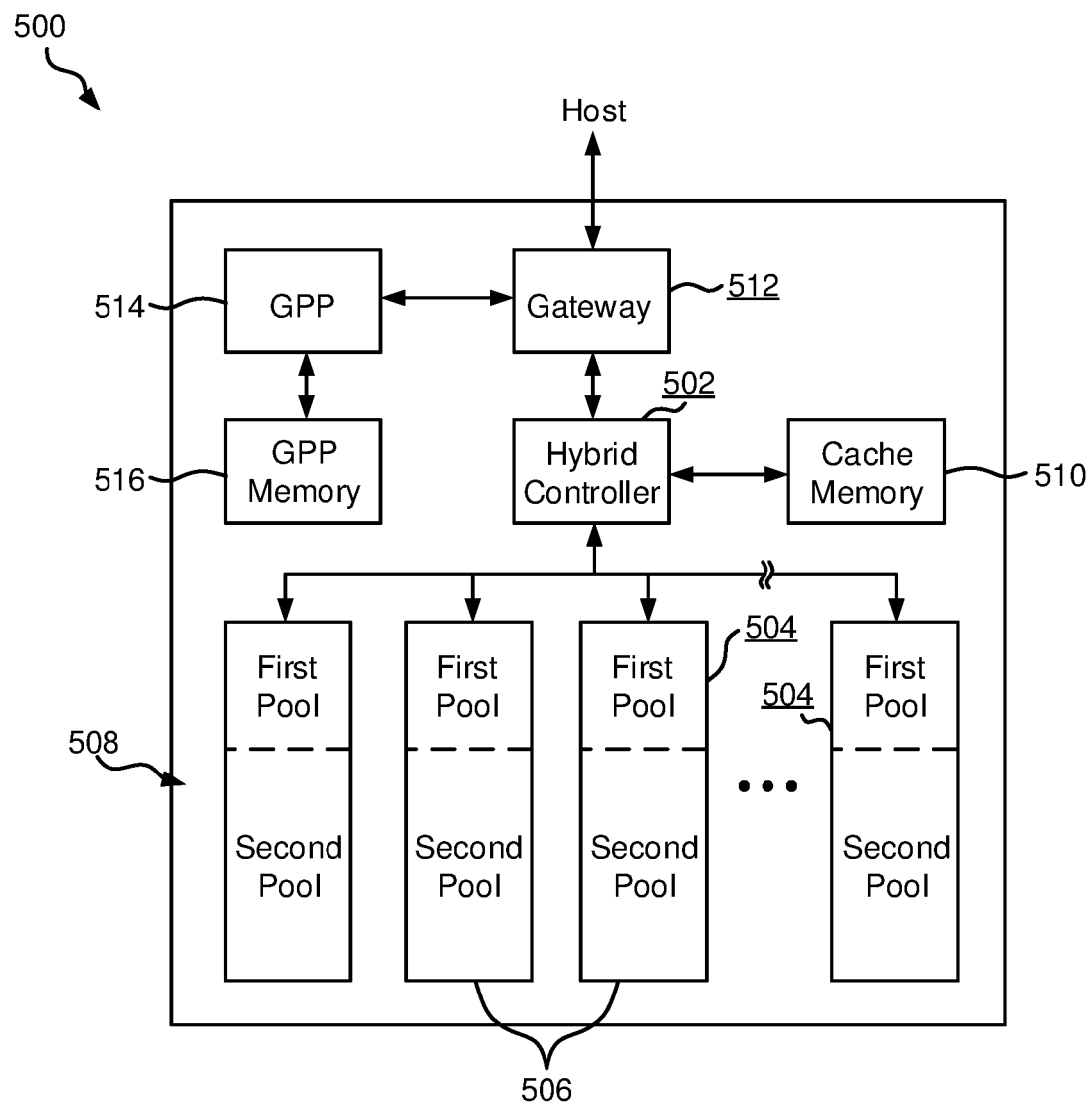
FIG. 5 is a partial representational view of a non-volatile memory module, in accordance with one embodiment.

Looking now to FIG. 5, a non-volatile memory module 500 having a hybrid controller 502 is illustrated in accordance with one embodiment. As an option, the present memory module 500 may be implemented in conjunction with features from any other embodiment listed herein, such as those described with reference to the other FIGS. However, such memory module 500 and others presented herein may be used in various applications and/or in permutations which may or may not be specifically described in the illustrative embodiments listed herein. Further, the memory module 500 presented herein may be used in any desired environment. Thus FIG. 5 (and the other FIGS.) may be deemed to include any possible permutation.

As noted above, the memory module 500 includes a hybrid controller 502 which is capable of managing and/or adapting blocks which are configured in single-bit-per-cell mode (also referred to herein as "single-level cell mode", or "SLC mode") as well as multi-bit-per-cell mode. According to some approaches, the hybrid controller 502 manages the different block configurations by logically splitting them into two different pools 504, 506. In other words, the blocks are each configured to operate in a certain mode and are logically assigned to the corresponding storage pool. Accordingly, one of these pools 504 is designated as including those blocks which are configured in SLC mode, while the other pool 506 includes the blocks configured in multi-bit-per-cell mode. In some approaches, the blocks configured in multi-bit-per-cell mode are configured in triple-level cell (TLC) mode. In other approaches, the blocks configured in multi-bit-per-cell mode are configured in quad-level cell (QLC) mode. In further approaches, the blocks configured in multi-bit-per-cell mode are configured in penta-level cell (PLC) mode.

Each of the pools 504, 506 extend across a number of data storage components (e.g., NVRAM memory modules such as NAND flash memory devices) which together serve as a memory array 508. It follows that the various components illustrated in FIG. 5 function as a memory card and may implement any of the approaches described above with respect to memory card 100 of FIG. 1. Referring still to FIG. 5, the hybrid controller 502 is also coupled to a cache memory 510 as well as a gateway 512 which receives data commands from one or more hosts, storage systems, running applications, etc. The gateway 512 is in turn coupled to a GPP 514 and GPP memory 516. As mentioned above, the GPP 514 may be of any desired type, e.g., such as an ASIC, FPGA, CPU, etc. Similarly, the GPP memory 516 may be of any desired type, e.g., such as RAM, ROM, battery-backed DRAM, phase-change memory PC-RAM, MRAM, STT-MRAM, etc., and/or combinations thereof.

The hybrid controller 502 may store data that is frequently accessed (e.g., read, rewritten, appended to, etc.) in blocks that are configured in SLC mode and therefore included in the first pool 504, while data that is accessed less frequently is stored in blocks that are configured in multi-bit-per-cell mode and therefore included in the second pool 506. This storage scheme achieves an efficient use of the different blocks of memory and their respective performance characteristics. However, as memory blocks in each of the pools 504, 506 experience different amounts of wear as well as different numbers of P/E cycles over time, the effective health of each block diverges from the others. Even though wear of different blocks increases differently with increasing P/E cycles, for the same P/E cycles, the wear experienced in multi-bit-cells increases faster than that experienced in SLC cells on average. Moreover, as the ratio of hot and cold data stored in the memory module 500 fluctuates over time, each of the respective pools 504, 506 may be underutilized and/or overutilized.

Accordingly, the hybrid controller 502 is able to selectively reconfigure any of the blocks in the first and/or second pools 504, 506 to dynamically adapt the memory based on actual utilization and/or workload properties. This allows for the memory module 500 to regulate the effective health of each of the memory blocks in some approaches, e.g., by performing wear leveling. Efficient performance of the overall module 500 is also maintained irrespective of the amount of hot or cold data stored therein.

The memory module 500 is also able to regulate the number of memory blocks that are included in each of the first and second pools 504, 506, such that I/O rates experienced by the module 500 as a whole may be sustained. Thus, in preferred approaches the memory module 500 is able to detect when the I/O rates received from the host cannot be sustained, e.g., due to a low number of memory blocks in RTU queues for the first and second pools 504, 506. In response to detecting an unsustainable I/O rate, reactive and/or predictive measures are taken to avoid experiencing performance delays and other inefficiencies. Approaches which involve performing reactive measures may include throttling the I/O rate by intentionally injecting selective amounts of latency in order to avoid larger and uncontrolled spikes in latency. Moreover, approaches which involve performing predictive measures may include attempting to reduce the total I/O bandwidth (e.g., internal and external I/O traffic) by bypassing a SLC cache to reduce internal data movement, e.g., as will be described in further detail below.

Figure 6:
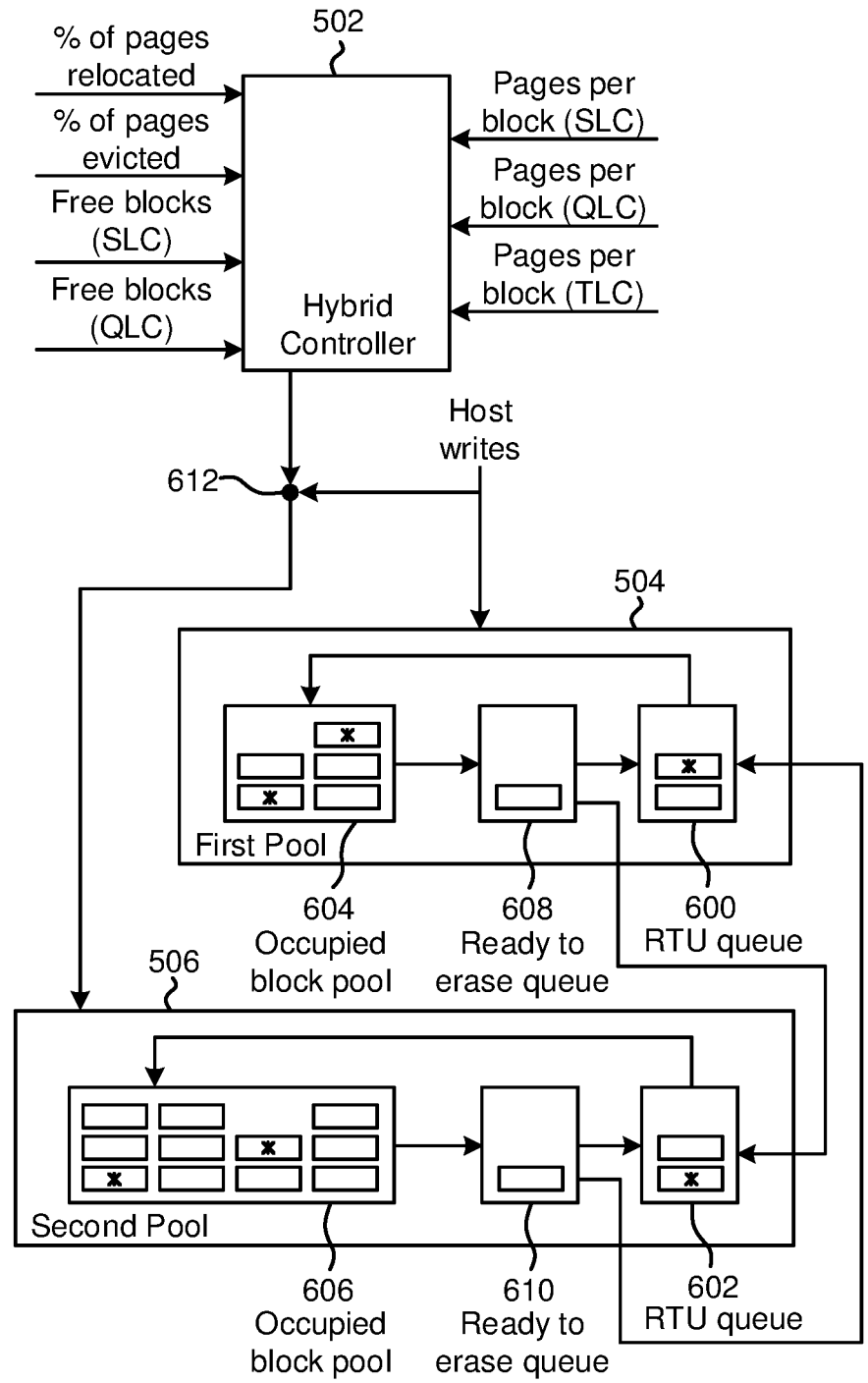
FIG. 6 is a partial representational view of a data and block flow overview, in accordance with one embodiment.

FIG. 6 provides a detailed view of the first and second pools 504, 506 in FIG. 5 and therefore various components of FIG. 6 have common numbering with those of FIG. 5. As shown, the first and second pools 504, 506 each receive I/O requests (e.g., such as write operations) from the hybrid controller 502. Data in the write operations received by each of the first and second pools 504, 506 is used to fill blocks of memory which have accumulated in the first and second RTU queues 600, 602. As blocks in the first and second RTU queues 600, 602 are filled, they are returned to the respective occupied block pools 604, 606 where they remain until they are identified as being ready to undergo a garbage collection procedure.

Upon reaching a low level of erased blocks in one of the RTU queues 600, 602, the garbage collector selects a block from the corresponding occupied block pools 604, 606 which has a high number of invalidated pages. As noted above, data included in blocks of memory is invalidated over time as a result of write updates, deletion operations, etc. Once invalidated, the data in a given block of memory is effectively useless and may be deleted. However, selected portions of data cannot be deleted from a block of non-volatile memory while maintaining the remainder of the data in the block. Rather, valid data is first relocated before the whole block is erased. It follows that as the amount of invalidated data in a given block of memory increases, the block becomes an increasingly inefficient use of storage space, thereby increasing the incentive to perform a garbage collection operation on the block. Inversely, performing a garbage collection operation on a block of memory which has a low amount of invalidated data therein is an inefficient use of computing resources and actually decreases efficiency. This tradeoff between computing resource utilization and storage space reclamation may thereby be balanced as desired. The garbage collector then relocates all still valid data to new locations before the block is identified as ready to erase.

Blocks identified as ready to erase are transitioned to a ready to erase queue 608, 610 in each of the first and second pools 504, 506, respectively. After entering the ready to erase queues 608, 610, a block is eventually erased and returned to the respective RTU queue 600, 602. Blocks of memory may also be transitioned between the first and second pools 504, 506. However, it should be noted that erase operations are performed slightly differently for blocks configured in SLC mode compared to blocks that are configured in multi-bit-per-cell mode. Therefore, the target mode (e.g., the mode a given block is intended to be configured in) for a block is preferably specified when the block is being erased. This results in blocks being able to move from ready to erase queue 610 to RTU queue 602 or 600, and similarly move from ready to erase queue 608 to RTU queue 600 or 602, e.g., as indicated by the different arrowed lines in FIG. 6.

According to the present description, a block that is "transferred" between pools, or between queues, remains physically in the same plane and channel of memory. In other words, while the functional characteristics of the given block may change as a result of activating and/or deactivating certain bits in each of the cells therein, the blocks themselves do not physically move in the memory. Rather, the blocks are "transferred" between pools, or between queues, in a logical sense. The erase operation may involve specifying the target mode of the block. In some approaches these transfers are indicated in an LPT, an operations log, a block status table, etc.

With continued reference to FIG. 6, incoming host I/O operations involving new data (e.g., host writes) are typically directed to the blocks included in the first pool 504 which are configured in SLC mode. Storing incoming data in blocks configured in SLC mode is beneficial as the single-bit pool (first pool 504) has improved performance characteristics and endurance compared to blocks in the multi-bit pool (second pool 506). However, the number of blocks included in the RTU queue 600 effects the number of I/O operations, particularly write operations, that may be satisfied. Accordingly, in certain conditions a relief valve 612 may be activated such that I/O operations including host write operations are directed to the second pool 506, thereby bypassing the first pool 504 altogether.

The hybrid controller 502 is illustrated in the present embodiment as controlling the activation and/or deactivation of the relief valve 612, yet in some approaches a dedicated logic module may be implemented in firmware and used to decide when to activate and/or deactivate the relief valve 612. Activation of this relief valve 612 is preferably based on one or more dynamic metrics which are maintained during regular I/O processing. An illustrative list of dynamic metrics which may be used to determine whether to activate and/or deactivate the relief valve 612 include, but are in no way limited to, a number of ready-to-use memory blocks for each of the memory tiers, a rate at which memory blocks of the different configurations are cleaned, a rate at which data is destaged from the first pool 504 to the second pool 506, a rate at which data is invalidated in the first pool 504, an amount of NVRAM available, etc. One or more static parameters that are related to the memory technology or to the controller architecture itself may also be implemented in determining whether to activate and/or deactivate the relief valve 612. An illustrative list of dynamic metrics which may be used to determine whether to activate and/or deactivate the relief valve 612 include, but are in no way limited to, latencies involved with programming and/or reading pages, latencies involved with erasing memory blocks, a number of pages included in each memory block for each of the different configurations, latency involved with switching the configuration of a memory block, the number of pages per block in each mode, the number of blocks per block stripe, the number of planes involved in multi-plane operations, the current state of the relief valve, etc. Accordingly, the hybrid controller 502 is shown as having a number of inputs, each of which correspond to a different static or dynamic metric which may be used to determine whether to activate and/or deactivate the relief valve 612, e.g., as will be described in further detail below.

Figure 7A:
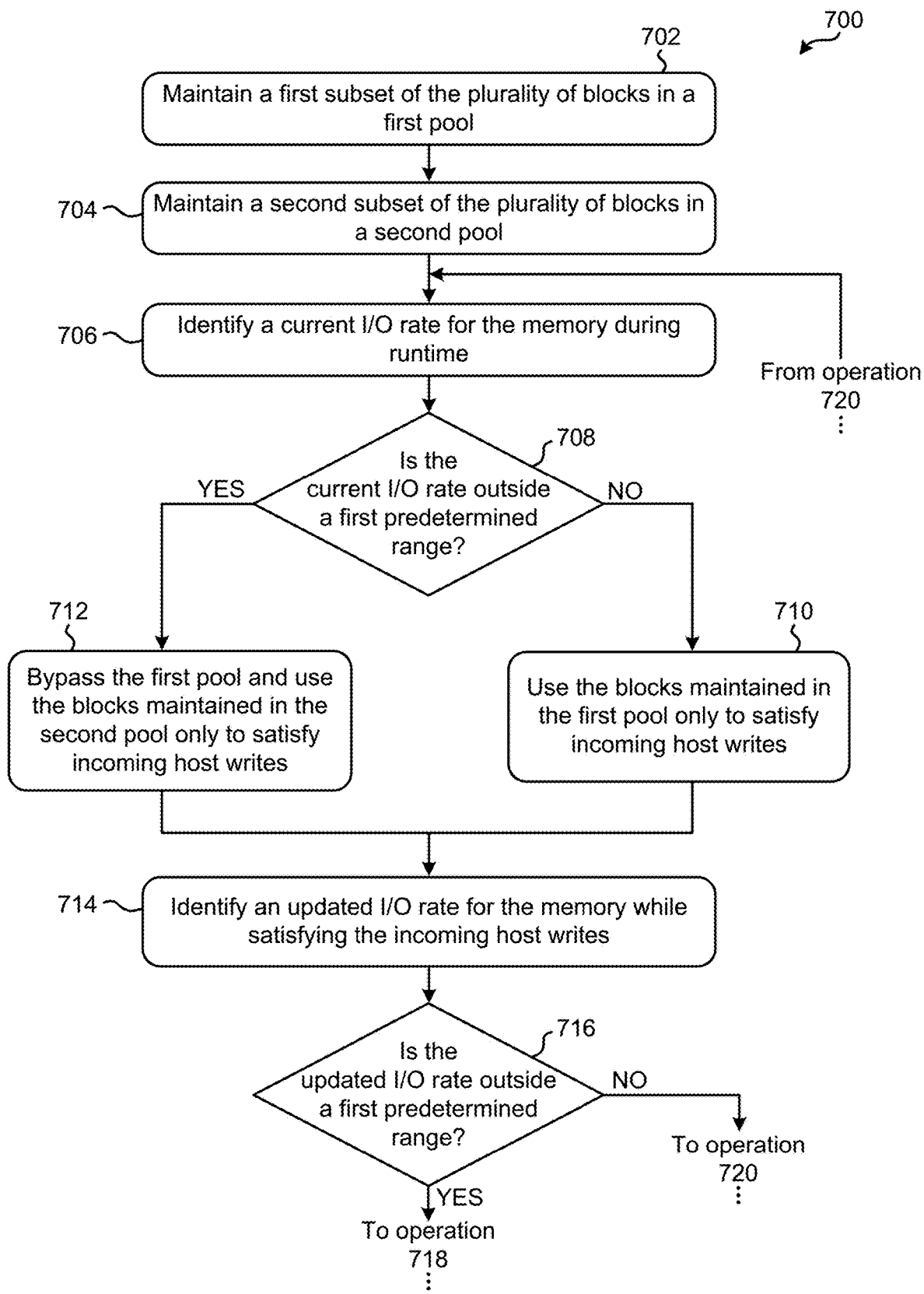
FIG. 7A is a flowchart of a method, in accordance with one embodiment.
Figure 7A:
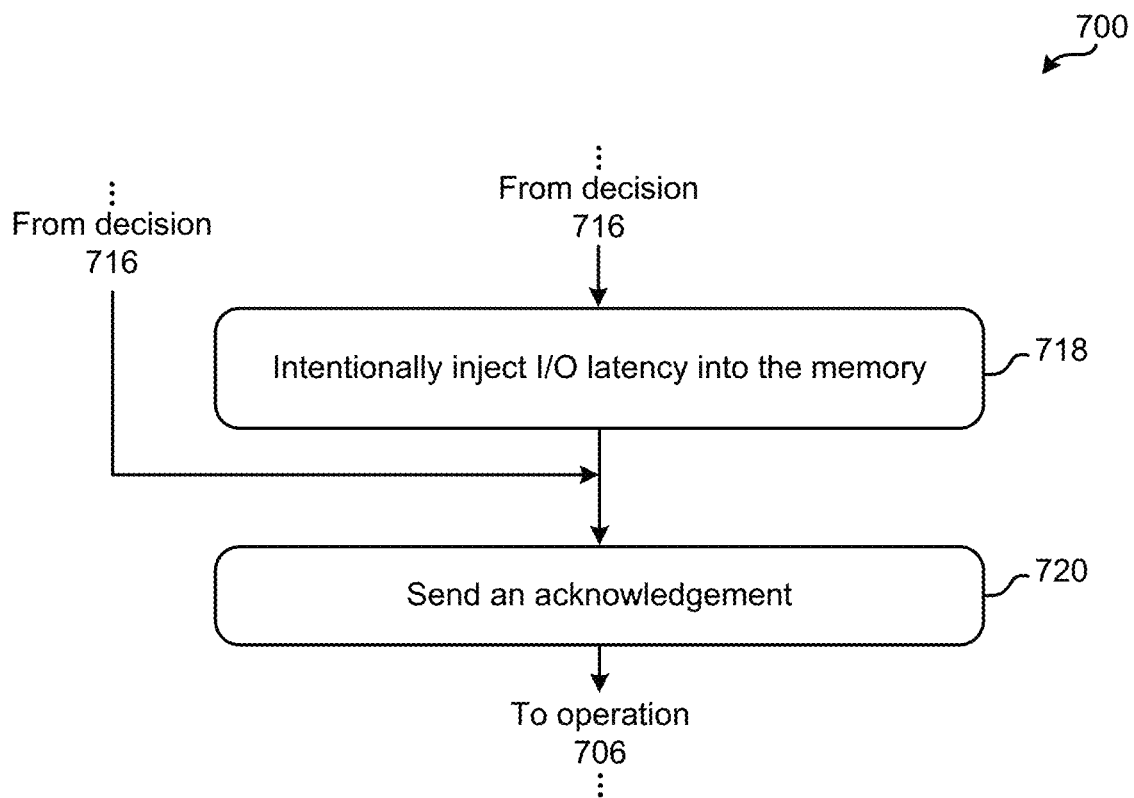

Looking now to FIG. 7A, a method 700 for managing a plurality of blocks of memory in two or more pools of a storage system, is shown according to one embodiment. The method 700 may be performed in accordance with the present invention in any of the environments depicted in FIGS. 1-6, among others, in various embodiments. Of course, more or less operations than those specifically described in FIG. 7A may be included in method 700, as would be understood by one of skill in the art upon reading the present descriptions.

Each of the steps of the method 700 may be performed by any suitable component of the operating environment. For example, in various embodiments, the method 700 may be partially or entirely performed by a hybrid controller, a controller, a processor, a computer, etc., or some other device having one or more processors therein. Thus, in some embodiments, method 700 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7A, operation 702 of method 700 includes maintaining a first subset of the plurality of blocks in a first pool. The memory blocks included in the first subset and which are maintained in the first pool are configured in SLC mode. Moreover, operation 704 includes maintaining a second subset of the plurality of blocks in a second pool. The memory blocks included in the second subset and which are maintained in the second pool are configured in multi-bit-per-cell mode. According to an illustrative approach which is in no way intended to limit the invention, operation 702 includes maintaining the first subset of memory blocks in the first pool 504 of FIG. 5 above, while operation 704 includes maintaining the second subset of memory blocks in the second pool 506.

Referring still to FIG. 7A, operation 706 includes identifying a current I/O rate for the memory during runtime. In other words, operation 706 includes monitoring I/O operations as they are received, monitoring the internal I/O operations, and using information corresponding thereto to determine a current I/O rate experienced by the storage system. It follows that this "current I/O rate" preferably continues to be updated over time such that it provides an accurate representation. Thus, in preferred approaches the current I/O rate may continue to be updated in real-time using any desired refresh rate, e.g., every second, every minute, every hour, every other hour, etc. In some embodiments, operation 706 can also take into account the expected internal relocation traffic the controller will experience in the near future. The expected relocation traffic can be estimated, for example, from the amount of valid data present in the blocks in the erase queues 608 and 610 shown in FIG. 6.

From operation 706, method 700 proceeds to decision 708 which includes determining whether the current I/O rate is outside a first predetermined range (or equivalently, inside a first predetermine range). In other words, decision 708 includes determining whether the I/O rate is unsustainable given the current state of the system. The first predetermined range is preferably selected based, at least in part, on the number of memory blocks included in each of the first and second pools, the number of Flash chips and channels, the specification of the Flash chips, the type of I/O operations that are being received (e.g., whether they include host write operations), user preference, past system performances, industry standards, product specifications, etc.

In response to determining that the current I/O rate is not outside the first predetermined range, method 700 proceeds to operation 710. There, operation 710 includes using the blocks maintained in the first pool only to satisfy incoming host writes. In other words, in response to determining that the current I/O rate is sustainable given the current state of the system, host write operations are continued to be satisfied (e.g., performed) using the memory blocks included in the first pool which are configured in SLC mode. As mentioned above, host I/O operations involving new data are typically directed to the blocks which are configured in SLC mode. Again, while blocks having multi-bit-per-cell configurations are able to store more information than blocks having a single-bit-per-cell configuration, memory blocks having a single-bit-per-cell configuration experience write latencies that are up to 10 times lower than experienced by memory blocks having multi-bit-per-cell configurations. Similarly, memory blocks having a single-bit-per-cell configuration experience lower read latencies than memory blocks having multi-bit-per-cell configurations. Accordingly, it is desirable that new data received in association with host write operations is stored in blocks that are configured in SLC mode.

While it is desirable that host writes are satisfied using blocks that are configured in SLC mode, if the number of ready-to-use blocks configured as such fall below a certain number, the system turns to blocks configured differently in order to perform the host writes. The number of available blocks is also related to the current I/O rate as the current I/O rate influences the rate at which blocks are used, thereby impacting a number of blocks that are available. Accordingly, returning to decision 708, method 700 jumps to operation 712 in response to determining that the current I/O rate is outside the first predetermined range. There, operation 712 includes bypassing the first pool and using the blocks maintained in the second pool only to satisfy incoming host writes. Although using memory blocks configured in SLC mode to perform host writes having new data is more efficient, e.g., for the reasons discussed above, using blocks configured in multi-bit-per-cell mode to counteract I/O rates which cannot be maintained is an efficient solution to the situation. In doing so, internal data movement is reduced which helps return I/O rates to sustainable levels which the system is able to maintain without experiencing a shortage of ready-to-use memory blocks in a given pool.

Figure 7B:
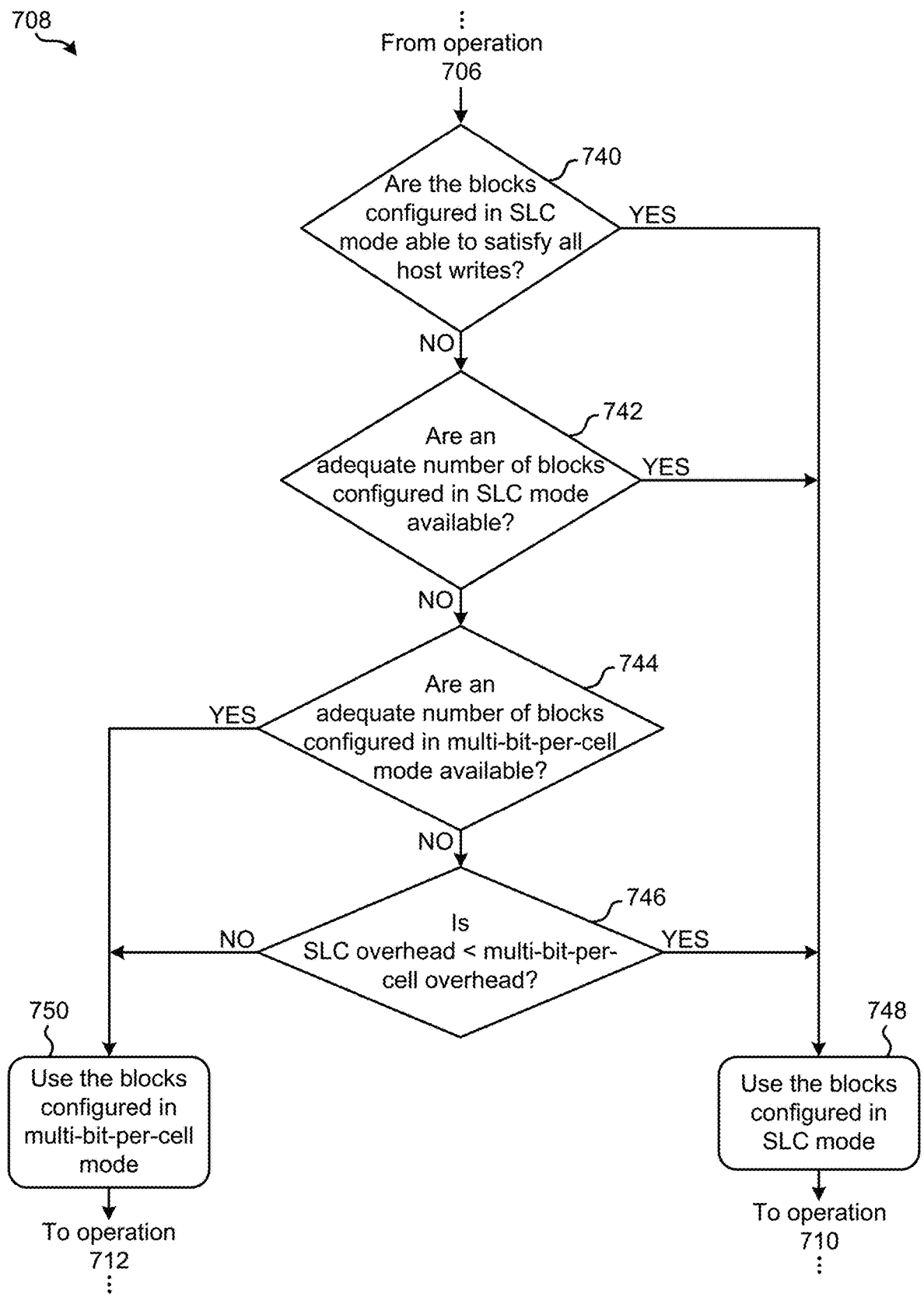
FIG. 7B is a flowchart of sub-processes for one of the operations in the method of FIG. 7A, in accordance with one embodiment.

It follows that bypassing the first pool and using the blocks maintained in the second pool only to satisfy incoming host writes as included in operation 712 includes activating a relief valve, e.g., see 612 of FIG. 6 above. Referring momentarily now to FIG. 7B, exemplary sub-processes of determining whether to bypass the first pool and use the blocks maintained in the second pool only to satisfy incoming host writes are illustrated in accordance with one embodiment, one or more of which may be used to perform decision 708 of FIG. 7A. However, it should be noted that the sub-processes of FIG. 7B are illustrated in accordance with one embodiment which is in no way intended to limit the invention.

As shown, decision 740 includes determining whether the blocks configured in SLC mode are able to satisfy all incoming host writes. In other words, decision 740 includes determining whether the blocks configured in SLC mode are sufficient to store all host data. In some approaches, this may be achieved by determining whether a combined storage capacity of the blocks configured in SLC mode is greater than or equal to the current amount of data plus the necessary spare blocks to allow efficient garbage collection. According to an illustrative approach, which is in no way intended to limit the invention, decision 740 may include determining whether the user data is less than a predefined threshold, e.g., 10-25%, of the total storage capacity of the storage device.

In response to determining that there are enough blocks configured in SLC mode to store the current amount of data being processed, the flowchart jumps to sub-operation 748 which includes using the blocks configured in SLC mode, e.g., such that an overarching determination may be made that the current I/O rate is not outside the first predetermined range. This determination may cause method 700 to proceed from decision 708 to operation 710 such that only the blocks maintained in the first pool are used to satisfy the incoming host writes, e.g., as described above.

However, referring still to FIG. 7B, the flowchart proceeds from decision 740 to decision 742 in response to determining that there are not enough blocks configured in SLC mode to store the current amount of data being processed. There, decision 742 includes determining whether an adequate number of blocks configured in SLC mode are available to store the current amount of data being processed. In other words, decision 742 includes determining whether a number of a first subset of blocks that are included in a RTU queue which corresponds to the first pool is in a predetermined range. In some approaches only blocks configured in SLC mode which are also included in a ready-to-use queue are considered in making the determination.

According to an illustrative approach, which is again in no way intended to limit the invention, decision 742 may involve determining whether the number of blocks configured in SLC mode is greater than a predetermined threshold. In some approaches the threshold may be predetermined by a user, but may be based on industry standards, past performance, product specifications, etc. In a preferred approach, this threshold is also adjusted based on the present state of the relief valve in such a way that it reduces oscillations between the on (operation 750) and off (operation 748) states thereof. For example, in situations where the relief valve is currently turned on (i.e., host writes are bypassing the SLC tier, operation 750), the SLC RTU threshold is preferably increased, meaning that data is more likely to continue being written to the QLC tier. Similarly, the aforementioned predetermined range may be narrowed in response to determining that the number blocks included in a RTU queue which corresponds to the first pool is not in a predetermined range.

Although it is preferred that the number of oscillations experienced by the relief valve between the on and off state is reduced, incoming host writes may be redirected back to the blocks maintained in the first pool. Accordingly, in response to determining that an adequate number of blocks configured in SLC mode are available to store the current amount of data being processed, the flowchart again jumps to sub-operation 748 such that an overarching determination may be made that the current I/O rate is not the first predetermined range. This determination may cause method 700 to proceed from decision 708 to operation 710 such that only the blocks maintained in the first pool are used to satisfy the incoming host writes, e.g., as described above.

Returning to decision 742, the flowchart proceeds to decision 744 in response to determining that an adequate number of blocks configured in SLC mode are not available to store the current amount of data being processed. There, decision 744 includes determining whether an adequate number of blocks configured in multi-bit-per-cell mode are available to store the current amount of data being processed. In some approaches only blocks configured in QLC and/or TLC mode which are also included in a ready-to-use queue are considered in making the determination.

According to an illustrative approach, which is again in no way intended to limit the invention, decision 744 may involve determining whether the number of blocks configured in multi-bit-per-cell mode is greater than another predetermined threshold. In some approaches the threshold may be predetermined by a user, but may be based on industry standards, past performance, product specifications, etc. As noted above, it is preferred that this threshold is also adjusted based on the present state of the relief valve in such a way that it reduces oscillations between the on (operation 750) and off (operation 748) states. For example, in case the relief valve is currently turned off (i.e., host writes are being written to the SLC tier, operation 748), the QLC RTU threshold is preferably decreased such that data is more likely to continue being written to the SLC tier. Similarly, the predetermined range may be broadened in response to determining that the number blocks included in a RTU queue which corresponds to the first pool actually is in the predetermined range mentioned above.

In response to determining that an adequate number of blocks configured in multi-bit-per-cell mode are available to store the current amount of data being processed, the flowchart jumps to sub-operation 750 such that an overarching determination may be made that the current I/O rate is outside the first predetermined range. This determination may cause method 700 to proceed from decision 708 to operation 712 such that only the blocks maintained in the second pool are used to satisfy the incoming host writes, e.g., as described above.

Returning again to decision 744, the flowchart illustrated in FIG. 7B alternatively proceeds to decision 746 in response to determining that an adequate number of blocks configured in multi-bit-per-cell mode are not available to store the current amount of data being processed. There, decision 746 includes determining whether writing the current amount of data being processed to blocks configured in SLC mode would produce less processing overhead than writing the current amount of data being processed to blocks configured in multi-bit-per-cell mode. In other words, decision 746 includes determining whether using the blocks maintained in the second pool only to satisfy incoming host writes would produce a greater amount of internal I/O traffic than an amount of internal I/O traffic produced by using the blocks maintained in the first pool only to satisfy incoming host writes. According to an illustrative approach, which is in no way intended to limit the invention, the amount of overhead expected by writing to the SLC tier is computed using Equation 1, while the amount of overhead expected by writing directly to the QLC tier is computed using Equation 2.

As shown, in response to determining that writing the data to blocks configured in SLC mode would produce less processing overhead than writing the data to blocks configured in multi-bit-per-cell mode, the flowchart proceeds to sub-operation 748 such that the blocks configured in SLC mode may actually be used to store the data. However, in response to determining that writing the data to blocks configured in SLC mode would produce more processing overhead than writing the data to blocks configured in multi-bit-per-cell mode, the flowchart proceeds to sub-operation 750 such that the blocks configured in multi-bit-per-cell mode may actually be used to store the data. In some approaches, the process of using the blocks configured in multi-bit-per-cell mode to store the data involves activating a relief valve which bypasses the first pool, e.g., as will soon become apparent. It is also preferred in some approaches that the relief valve becomes more difficult to deactivate in response to it being activated. Similarly, it is preferred that the relief valve becomes more difficult to activate in response to it being deactivated. As mentioned above, this desirably avoids situations where the relief valve oscillates between activated (on) and deactivated (off) states.

Again, the various sub-processes included in FIG. 7B may be used to determine whether a relief valve should be activated in order to bypass the first pool and use the blocks maintained in the second pool only to satisfy incoming host writes. It should also be noted that the various sub-processes included in FIG. 7B may be performed in any desired order. Some of the sub-processes included in FIG. 7B may even be skipped in some approaches, e.g., as would be appreciated by one skilled in the art after reading the present description. It should also be noted that in some approaches read and/or write heat may also be incorporated in the process of determining whether a relief valve should be activated in order to bypass the first pool and use the blocks maintained in the second pool only to satisfy incoming host writes, e.g., as described in the various approaches above.

Returning to method 700 of FIG. 7A, operation 714 includes identifying an updated I/O rate for the memory while satisfying the incoming host writes. It follows that operation 714 is performed, at least in part, while the incoming host writes are being satisfied. For instance, operation 714 may include collecting performance data while the host writes are being satisfied, followed by making a determination as to what the updated I/O rate for the memory is. Any one or more of the approaches described above with respect to performing operation 706 may be implemented in order to perform operation 714, e.g., as would be appreciated by one skilled in the art after reading the present description.

Decision 716 further includes determining whether the updated I/O rate is outside the first predetermined range. In other words, decision 716 includes determining whether the updated I/O rate is unsustainable in response to the changes made as a result of implementing operation 710 or 712 in response to performing decision 708 as described above. According to an illustrative approach, which is in no way intended to limit the invention, the total I/O bandwidth involved with servicing the workload is computed and may be compared with the statically computed I/O bandwidth available. The total I/O bandwidth involved with processing one write I/O can be monitored over a window of time or computed based on the rate and/or type of user I/O requests. The overhead for computing the bandwidth for a host write can be based on the equation of $\min(O_{slc}, O_{qlc})$. Moreover, in response to determining that the I/O rate is not sustainable based on this comparison, I/O latency may be injected into the system, e.g., based on the number of memory blocks that are currently in the respective RTU queues. The difference between the current I/O rate and the sustainable I/O rate may also be used to determine an amount of I/O latency that is injected.

The I/O latency that is intentionally injected into the performance of the system may remain enacted for any desired amount of time. In preferred approaches, any intentionally injected I/O latency is removed in response to determining that the updated I/O rate has become sustainable. However, the intentionally injected I/O latency may be removed after a predetermined amount of time has passed, a predetermined number of I/O cycles have been performed, in response to receiving an instruction to do so (e.g., from a user), etc. Moreover, the intentionally injected I/O latency may be removed using steps similar to those performed to inject the I/O latency, or any other processes which would be apparent to one skilled in the art after reading the present description.

In response to determining that the updated I/O rate is not outside the first predetermined range, method 700 jumps to operation 720 before returning to operation 706, e.g., such that I/O rates of the overarching system may continue to be monitored. Operation 720 includes sending an acknowledgement, e.g., as will be described in further detail below. In some approaches, any intentionally injected I/O latency may be removed in response to determining that the updated I/O rate is not outside the first predetermined range, e.g., prior to advancing to operation 720.

Returning to decision 716, method 700 proceeds to operation 718 in response to determining that the updated I/O rate is outside the first predetermined range. There, operation 718 includes intentionally injecting (e.g., introducing) I/O latency into the memory. Although introducing I/O latency is particularly undesirable in most situations, it can be appreciated here that intentionally introducing latency into the memory (or system as a whole) allows for method 700 to compensate for unsustainable I/O rates that otherwise cannot adequately be reduced and would lead to uncontrolled variations in I/O throughput and latency as experienced by the user of the storage system. In an illustrative approach, which is in no way intended to limit the invention, injecting I/O latency into the memory is based on a difference between the updated I/O rate and a maximum sustainable I/O rate for the given memory and/or storage system. In other words, the amount of I/O latency which is injected into the memory is selected in order to adjust the experienced I/O rate such that it reaches a level which is sustainable for the given memory and/or overarching storage system. This desirably avoids situations where an excessive amount of I/O latency is introduced to the memory and performance is unnecessarily reduced.

According to another approach, which is in no way intended to limit the invention, the amount of I/O latency injected into the memory is based on a number of the first subset of blocks that are included in a first RTU queue which corresponds to the first pool, and a number of the second subset of blocks that are included in a second RTU queue which corresponds to the second pool. In other words, the amount of I/O latency that is injected into the memory depends on the number of each type of memory block that are available.

For example, in situations where the number of blocks included in the first RTU queue and configured in SLC mode is undesirably low and the number of blocks included in the second RTU queue and configured in multi-bit-per-cell mode (e.g., QLC, TLC, etc.) is also undesirably low, a relatively greater amount of I/O latency may be intentionally injected in to the memory as the storage controller will perform additional cleaning (i.e., data relocations and garbage collection) so that the number of blocks in the RTU queues are restored to a desirable level. However, in situations where the number of blocks included in the first RTU queue and configured in SLC mode is undesirably low, while the number of blocks included in the second RTU queue and configured in multi-bit-per-cell mode is desirably high, a relatively lesser amount of I/O latency may be intentionally injected in to the memory, as cleaning is performed only in the single-bit pool and this cleaning can be facilitated by relocating data from the single-bit pool to the multi-bit pool by relying on the blocks in the second RTU queue, e.g., as would be appreciated by one skilled in the art after reading the present description.

With continued reference to FIG. 7A, method 700 proceeds from operation 718 to operation 720, which includes sending an acknowledgement. The acknowledgement preferably indicates whether I/O latency has been intentionally injected into the performance of the memory, e.g., such that a user is informed as to the current status of the memory. However, the acknowledgement may be sent to any desired location and/or may include any desired information, e.g., depending on the approach. From operation 720, method 700 returns to operation 706 such that the I/O rate for the memory may continue to be monitored. It follows that processes 706-718 may be repeated any number of times, e.g., in an iterative fashion, while the memory is being used to processes I/O operations.

It follows that various ones of the embodiments included herein are able to detect unsustainable I/O rates and respond by taking reactive and/or predictive measures to avoid experiencing performance delays and other inefficiencies. In preferred approaches, these measures are enacted based on the internal state of the controller, particularly the number and/or type of memory blocks that are available as well as other resources, e.g., such an NVRAM buffer space. Moreover, data placement decisions are able to minimize the internal data movement, thereby assisting the system return to the normal mode of operation.

As noted above, approaches which involve performing reactive measures may include throttling the I/O rate by intentionally injecting selective amounts of latency in order to avoid larger and uncontrolled spikes in latency. The amount of latency introduced to the system may be proportional to the number of available blocks in the RTU queues in some approaches, e.g., such that minimal throttling of the number of blocks is greater than a predetermined threshold or "high watermark". However, the throttling may be proportional if the number of available blocks is greater than a predetermined minimum value, but also less than the predetermined threshold or "high watermark". Further still, a maximum amount of throttling may be implemented if the number of available blocks falls below the predetermined minimum value. In some approaches the current percentage of internal bandwidth that is consumed may also be a factor in determining the amount of throttling that is injected into performance of the system.

Moreover, approaches which involve performing predictive measures may include attempting to reduce the total I/O bandwidth (e.g., internal and external I/O traffic) by bypassing a SLC cache to reduce internal data movement. In such approaches, this bypassing of the SLC cache may be implemented (e.g., the relief valve may be activated) in response to determining that the overhead involved with writing through the SLC cache exceeds the overhead of writing directly to QLC, e.g., as described above.

According to an in-use example, which is in no way intended to limit the invention, taking predictive measures to avoid experiencing performance delays and other inefficiencies involves comparing whether writing host data to blocks configured in SLC mode or multi-bit-per-cell mode would cause more internal data movement. Accordingly, comparing the average time it would take to store host data in blocks configured in SLC mode vs. multi-bit-per-cell mode involves expected internal data movement associated with the following equations.

$$O_{qlc} = \frac{tprog_{qlc} + tread_{qlc}}{1 - frel_{qlc}} + \frac{terase_{qlc}}{pages_{qlc}} \quad \text{Equation 1}$$

-continued $$O_{slc} = \frac{tprog_{slc} + frel_{slc} \cdot tread_{slc}}{1 - frel_{slc}} + \frac{terase_{slc}}{pages_{slc}} + fev \cdot O_{qlc} \quad \text{Equation 2}$$

A number of the metrics used in Equation 1 and Equation 2 are described in the table 770 illustrated in FIG. 7C. It should be noted that while a number of the metrics described in table 770 of FIG. 7C do not include the "slc" and "qlc" subscripts as they appear in Equation 1 and Equation 2, these subscripts are merely used to reference pages included in, or the latency experienced by, blocks configured in SLC mode and QLC mode. Moreover, $O_{qlc}$ represents an amount of overhead (e.g., total I/O latency to service a multi-bit-per-cell write and associated internal data movement) associated with memory blocks configured in multi-bit-per-cell mode, while $O_{slc}$ represents an amount of overhead (e.g., total I/O latency to service a SLC write and associated internal data movement) associated with memory blocks configured in SLC mode. The "frel", "fev" metrics can also be represented as averages over a window of time, averages over a number of accesses, computed based on the number of valid pages in the next memory blocks in line for cleaning (e.g., garbage collection), etc.

Again, it follows that various ones of the embodiments included herein are able to selectively activate a relief valve in order to improve performance. For instance, in situations where the relief value is disabled, the full benefits from using a SLC cache to process host I/O operations are achieved, e.g., in terms of latency and/or endurance. When the relief valve is activated, the internal overhead experienced from performing data relocations is significantly reduced in comparison to conventional processes, thereby improving overall the I/O performance of the system. Some of the embodiments included herein are thereby able to avoid scenarios where a SLC configured tier negatively impacts performance. Moreover, wear of the memory blocks can be balanced by additional processes which may be implemented in combination with the various approaches included herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
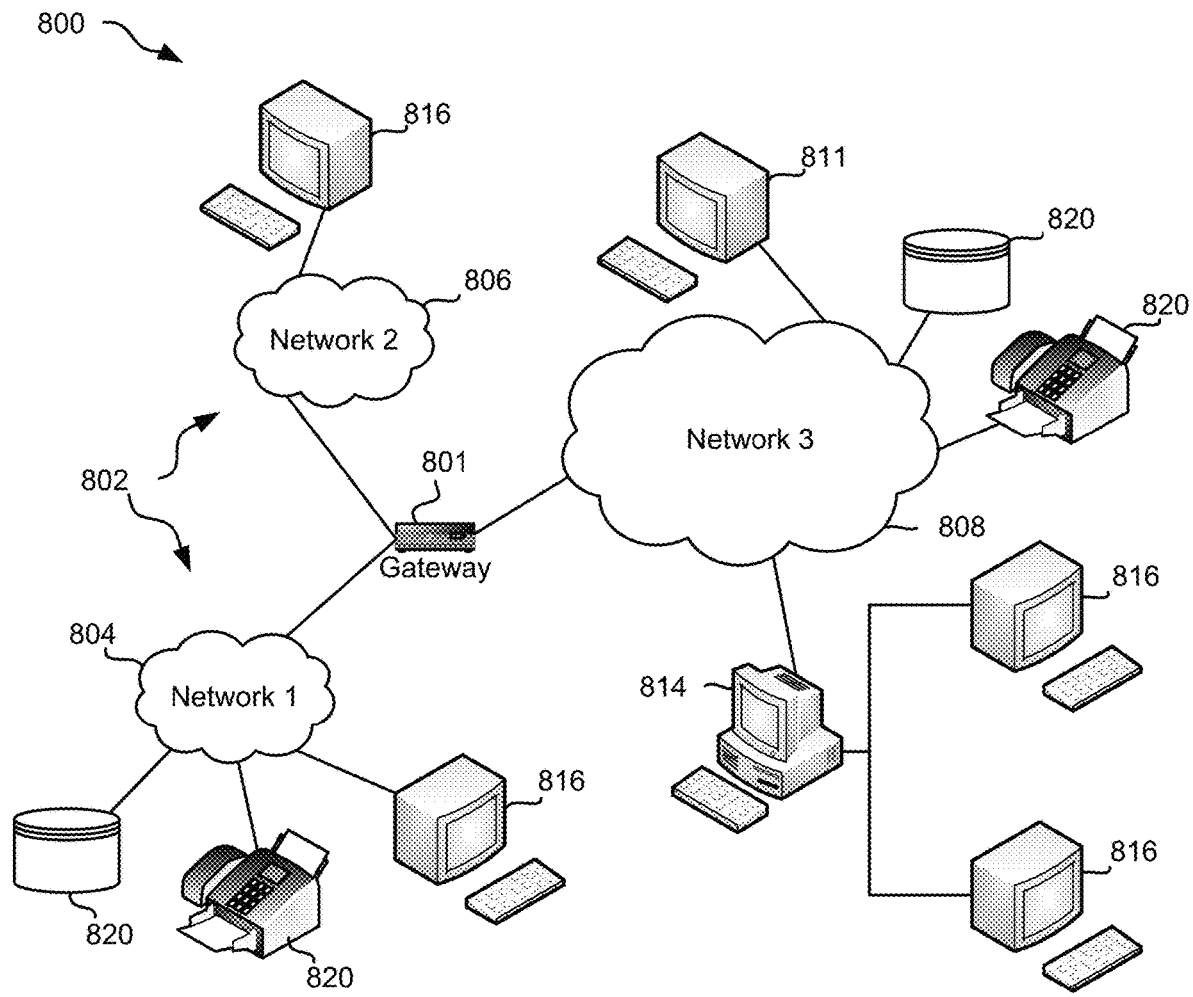
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
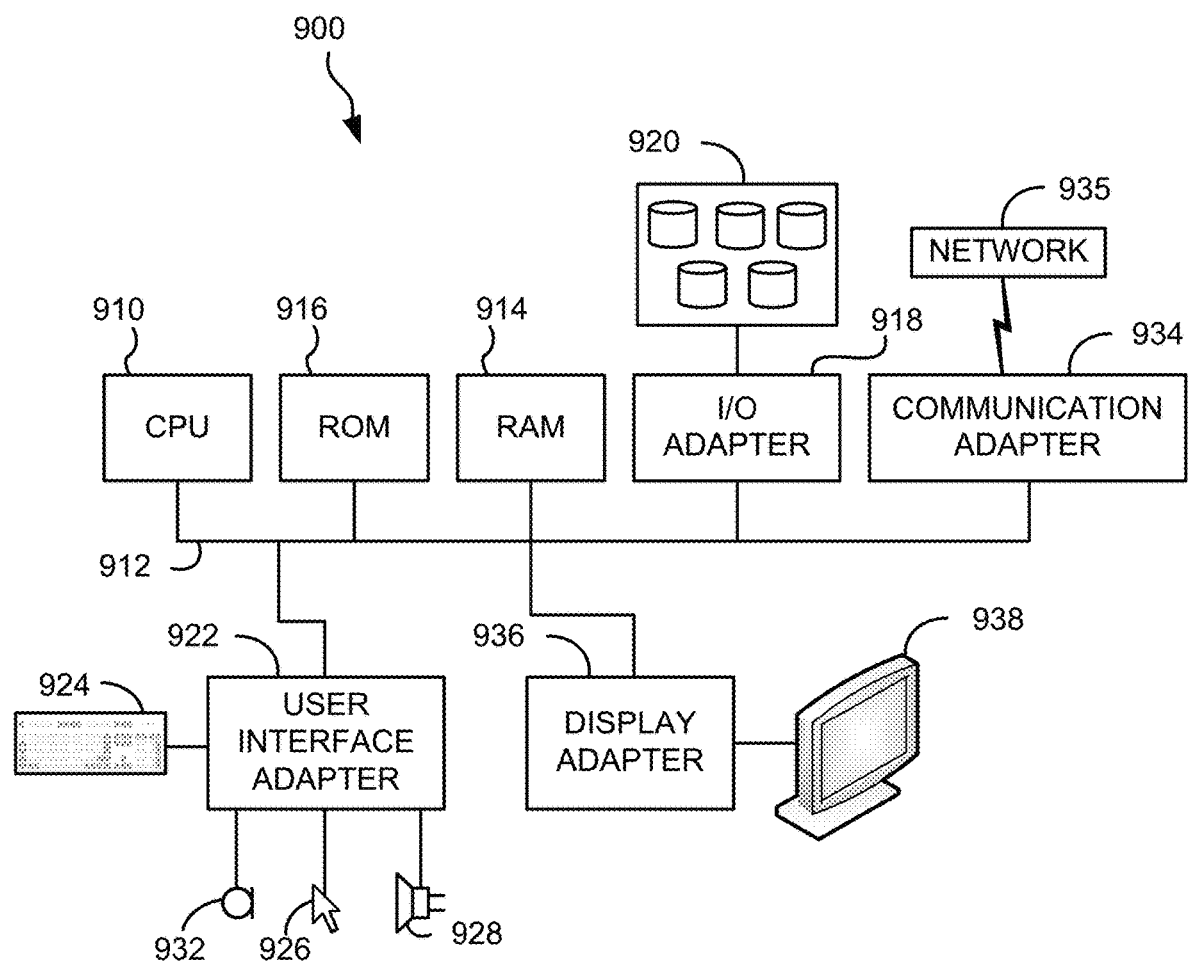
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
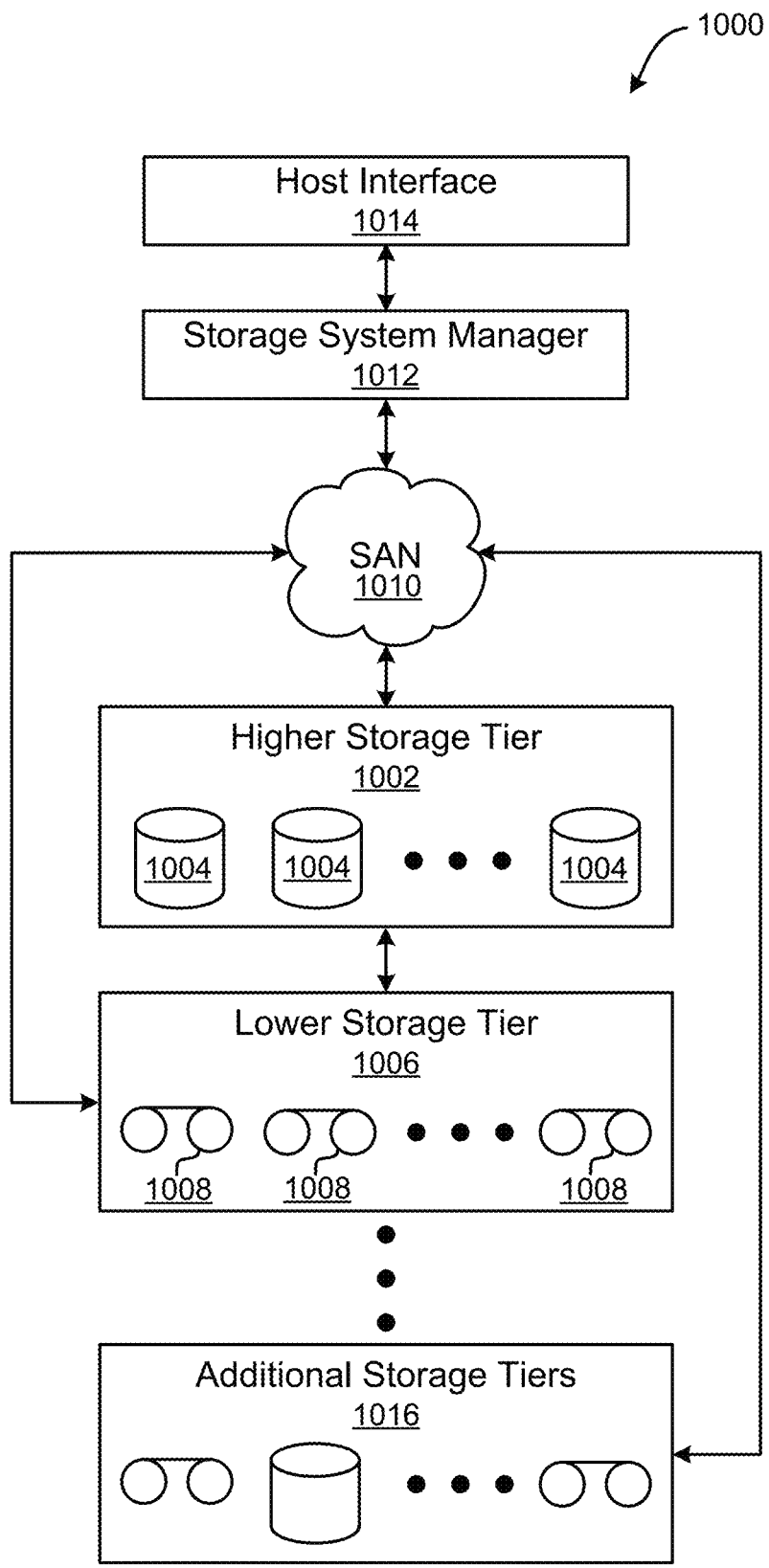
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a plurality of blocks of memory in two or more pools, comprising:
- maintaining a first subset of the plurality of blocks in a first pool, wherein the blocks maintained in the first pool are configured in single-level cell (SLC) mode;
- maintaining a second subset of the plurality of blocks in a second pool, wherein the blocks maintained in the second pool are configured in multi-bit-per-cell mode;
- identifying a current input/output (I/O) rate for the memory during runtime;
- determining whether the current I/O rate is outside a first predetermined range;
- in response to determining that the current I/O rate is not outside the first predetermined range, using the blocks maintained in the first pool to satisfy incoming host writes;
- in response to determining that the current I/O rate is outside the first predetermined range, using the blocks maintained in the second pool to satisfy incoming host writes;
- identifying an updated input/output (I/O) rate for the memory while satisfying the incoming host writes;
- determining whether the updated I/O rate is outside the first predetermined range; and
- intentionally injecting selective amounts of I/O latency into the memory in response to determining that the updated I/O rate is outside the first predetermined range.

2. The computer-implemented method of claim 1, wherein injecting I/O latency into the memory is based on a number of the first subset of blocks that are included in a first ready-to-use (RTU) queue which corresponds to the first pool, and a number of the second subset of blocks that are included in a second RTU queue which corresponds to the second pool.

3. The computer-implemented method of claim 1, wherein injecting I/O latency into the memory is based on a difference between the updated I/O rate and a sustainable I/O rate.

4. The computer-implemented method of claim 1, wherein the memory includes non-volatile random access memory (NVRAM).

5. The computer-implemented method of claim 1, wherein using the blocks maintained in the second pool to satisfy incoming host writes includes:
- activating a relief valve; and
- narrowing the first predetermined range.

6. The computer-implemented method of claim 1, wherein the blocks in the second pool that are configured in multi-bit-per-cell mode are configured in a multi-bit-per-cell mode selected from the group consisting of: triple-level cell (TLC) mode, quad-level cell (QLC) mode, and penta-level cell (PLC) mode.

7. The computer-implemented method of claim 1, wherein using the blocks maintained in the first pool to satisfy incoming host writes includes: broadening the first predetermined range.

8. The computer-implemented method of claim 1, comprising:
- in response to determining that the current I/O rate is outside the first predetermined range, determining whether the first subset of blocks is able to satisfy all incoming host writes;
- in response to determining that the first subset of blocks is not able to satisfy all incoming host writes, determining whether a number of the second subset of blocks that are included in a second RTU queue which corresponds to the second pool is in a second predetermined range;
- in response to determining that the number of the second subset of blocks that are included in the second RTU queue is not in the second predetermined range, determining whether using the blocks maintained in the second pool to satisfy incoming host writes would produce a greater amount of internal processing overhead than an amount of internal processing overhead produced by using the blocks maintained in the first pool to satisfy incoming host writes; and
- in response to determining that using the blocks maintained in the second pool to satisfy incoming host writes would not produce a greater amount of internal processing overhead than an amount of internal processing overhead produced by using the blocks maintained in the first pool to satisfy incoming host writes, using the blocks maintained in the second pool to satisfy incoming host writes.

9. A computer program product for managing a plurality of blocks of memory in two or more pools, the computer program product comprising a computer readable storage medium having program instructions embodied therewith, the program instructions readable and/or executable by a processor to cause the processor to:
- maintain, by the processor, a first subset of the plurality of blocks in a first pool, wherein the blocks maintained in the first pool are configured in single-level cell (SLC) mode;
- maintain, by the processor, a second subset of the plurality of blocks in a second pool, wherein the blocks maintained in the second pool are configured in multi-bit-per-cell mode;
- identify, by the processor, a current input/output (I/O) rate for the memory during runtime;
- determine, by the processor, whether the current I/O rate is outside a first predetermined range;
- in response to determining that the current I/O rate is not outside the first predetermined range, use, by the processor, the blocks maintained in the first pool to satisfy incoming host writes;
- in response to determining that the current I/O rate is outside the first predetermined range, use, by the processor, the blocks maintained in the second pool to satisfy incoming host writes;
- determine, by the processor, whether an updated I/O rate for the memory while satisfying the incoming host writes is outside the first predetermined range; and
- intentionally inject, by the processor, selective amounts of I/O latency into the memory in response to determining that the updated I/O rate is outside the first predetermined range.

10. The computer program product of claim 9, wherein the program instructions are readable and/or executable by the processor to cause the processor to:
- identify, by the processor, the updated I/O rate for the memory while satisfying the incoming host writes; and
- in response to determining that the updated I/O rate is no longer outside the first predetermined range, remove, by the processor, the intentionally injected I/O latency from the memory.

11. The computer program product of claim 10, wherein injecting I/O latency into the memory is based on a number of the first subset of blocks that are included in a first ready-to-use (RTU) queue which corresponds to the first pool, and a number of the second subset of blocks that are included in a second RTU queue which corresponds to the second pool.

12. The computer program product of claim 10, wherein injecting I/O latency into the memory is based on a difference between the updated I/O rate and a sustainable I/O rate.

13. The computer program product of claim 9, wherein the memory includes NAND Flash.

14. The computer program product of claim 9, wherein using the blocks maintained in the second pool to satisfy incoming host writes includes:
    activating a relief valve; and
    narrowing the first predetermined range.

15. The computer program product of claim 9, wherein the blocks in the second pool that are configured in multi-bit-per-cell mode are configured in a multi-bit-per-cell mode selected from the group consisting of: triple-level cell (TLC) mode, quad-level cell (QLC) mode, and penta-level cell (PLC) mode.

16. The computer program product of claim 9, wherein using the blocks maintained in the first pool to satisfy incoming host writes includes: broadening the first predetermined range.

17. The computer program product of claim 9, wherein the program instructions are readable and/or executable by the processor to cause the processor to:
    in response to determining that the current I/O rate is outside the first predetermined range, determine whether the first subset of blocks is able to satisfy all incoming host writes;
    in response to determining that the first subset of blocks is not able to satisfy all incoming host writes, determine whether a number of the second subset of blocks that are included in a second RTU queue which corresponds to the second pool is in a second predetermined range;
    in response to determining that the number of the second subset of blocks that are included in the second RTU queue is not in the second predetermined range, determining whether using the blocks maintained in the second pool to satisfy incoming host writes would produce a greater amount of internal processing overhead than an amount of internal processing overhead produced by using the blocks maintained in the first pool to satisfy incoming host writes; and
    in response to determining that using the blocks maintained in the second pool to satisfy incoming host writes would not produce a greater amount of internal processing overhead than an amount of internal processing overhead produced by using the blocks maintained in the first pool to satisfy incoming host writes, using the blocks maintained in the second pool to satisfy incoming host writes.

18. A system, comprising:
memory;
a processor; and
logic integrated with and/or executable by the processor, the logic being configured to:
    maintain, by the processor, a first subset of a plurality of blocks in a first pool, wherein the blocks maintained in the first pool are configured in single-level cell (SLC) mode;
    maintain, by the processor, a second subset of the plurality of blocks in a second pool, wherein the blocks maintained in the second pool are configured in multi-bit-per-cell mode;
    identify, by the processor, a current input/output (I/O) rate for the memory during runtime;
    determine, by the processor, whether the current I/O rate is outside a first predetermined range;
    in response to determining that the current I/O rate is not outside the first predetermined range, use, by the processor, the blocks maintained in the first pool to satisfy incoming host writes;
    in response to determining that the current I/O rate is outside the first predetermined range, use, by the processor, the blocks maintained in the second pool to satisfy incoming host writes; and
    intentionally inject, by the processor, selective amounts of I/O latency into the memory in response to: determining that a number of blocks in the first subset is outside a second predetermined range, and determining that a number of blocks in the second subset is outside the second predetermined range.

19. The system of claim 18, the logic being configured to:
identify, by the processor, an updated input/output (I/O) rate for the memory while satisfying the incoming host writes;
determine, by the processor, whether the updated I/O rate is outside the first predetermined range; and
intentionally inject, by the processor, selective amounts of I/O latency into the memory in response to determining that the updated I/O rate is outside the first predetermined range.

* * * * *